(12) United States Patent
Liu et al.

(10) Patent No.: US 7,302,106 B2
(45) Date of Patent: Nov. 27, 2007

(54) SYSTEM AND METHOD FOR INK OR HANDWRITING COMPRESSION

(75) Inventors: Zicheng Liu, Bellevue, WA (US); Henrique S. Malvar, Sammamish, WA (US); Zhengyou Zhang, Redmond, WA (US)

(73) Assignee: Microsoft Corp., Redmond, WA (US)

(*) Notice: Subject to any disclaimer, the term of this patent is extended or adjusted under 35 U.S.C. 154(b) by 892 days.

(21) Appl. No.: 10/440,643

(22) Filed: May 19, 2003

(65) Prior Publication Data

US 2004/0233197 A1 Nov. 25, 2004

(51) Int. Cl.
*G06K 9/36* (2006.01)
*G06F 3/02* (2006.01)

(52) U.S. Cl. ...................... 382/242; 345/172
(58) Field of Classification Search ................ 382/187, 382/241, 242; 345/172
See application file for complete search history.

(56) References Cited

U.S. PATENT DOCUMENTS 6,101,280 A * 8/2000 Reynolds .................... 382/241
7,039,234 B2 * 5/2006 Geidl et al. ................. 382/187
2003/0122802 A1 * 7/2003 Bryborn ...................... 345/173
2003/0123745 A1 * 7/2003 Bryborn ...................... 382/242

* cited by examiner

Primary Examiner—Vikkram Bali
(74) Attorney, Agent, or Firm—Lyon & Harr, LLP; Katrina A. Lyon

(57) ABSTRACT

A system and method for compressing digital pen stroke data utilizing curve simplification. Digital pen stroke images (ink images) generate a relatively large amount of data to preserve the ink image generated on a device. Current ink compression algorithms utilize lossless compression algorithm that have limited success. The invention provides a lossy compression algorithm to reduce the amount of data required to store and transmit ink data. The invention utilizes a two-part algorithm to reduce and compress the number of data points representing the ink data. The invention also utilizes curve splines to reconstruct and smooth the lossy ink data image.

44 Claims, 9 Drawing Sheets

Original points: solid line; modified points: dashed line

Stroke points:

| | ---------- Original points -------------- | | | | ---------- Modified points -------------- | | | |
|---|---|---|---|---|---|---|---|---|
| Index | X | Y | First X + Delta X | First Y + Delta Y | X' | Y' | First X' + Delta X' | First Y' + Delta Y' |
| 1 | 1686 | 8627 | 1686 | 8627 | 1690 | 8630 | 1690 | 8630 |
| 2 | 1688 | 8674 | 2 | 47 | 1690 | 8670 | 0 | 40 |
| 3 | 1674 | 8679 | -14 | 5 | 1670 | 8680 | -20 | 10 |
| 4 | 1601 | 8645 | -73 | -34 | 1600 | 8650 | -70 | -30 |
| 5 | 1550 | 8585 | -51 | -60 | 1550 | 8590 | -50 | -60 |
| 6 | 1524 | 8530 | -26 | -55 | 1520 | 8530 | -30 | -60 |
| 7 | 1527 | 8501 | 3 | -29 | 1530 | 8500 | 10 | -30 |
| 8 | 1548 | 8504 | 21 | 3 | 1550 | 8500 | 20 | 0 |
| 9 | 1670 | 8617 | 122 | 113 | 1670 | 8620 | 120 | 120 |
| 10 | 1675 | 8466 | 5 | -151 | 1680 | 8470 | 10 | -150 |
| 11 | 1684 | 8462 | 9 | -4 | 1680 | 8460 | 0 | -10 |
| 12 | 1796 | 8605 | 112 | 143 | 1800 | 8610 | 120 | 150 |
| 13 | 1848 | 8651 | 52 | 46 | 1850 | 8650 | 50 | 40 |
| 14 | 1854 | 8624 | 6 | -27 | 1850 | 8620 | 0 | -30 |
| 15 | 1835 | 8518 | -19 | -106 | 1840 | 8520 | -10 | -100 |
| 16 | 1873 | 8561 | 38 | 43 | 1870 | 8560 | 30 | 40 |
| 17 | 1974 | 8646 | 101 | 85 | 1970 | 8650 | 100 | 90 |
| 18 | 1988 | 8646 | 14 | 0 | 1990 | 8650 | 20 | 0 |
| 19 | 1976 | 8537 | -12 | -109 | 1980 | 8540 | -10 | -110 |
| 20 | 2099 | 8662 | 123 | 125 | 2100 | 8660 | 120 | 120 |
| 21 | 2113 | 8658 | 14 | -4 | 2110 | 8660 | 10 | 0 |
| 22 | 2119 | 8638 | 6 | -20 | 2120 | 8640 | 10 | -20 |
| 23 | 2119 | 8558 | 0 | -80 | 2120 | 8560 | 0 | -80 |
| 24 | 2138 | 8445 | 19 | -113 | 2140 | 8450 | 20 | -110 |

SYSTEM AND METHOD FOR INK OR HANDWRITING COMPRESSION

BACKGROUND

1. Technical Field

This invention is directed toward a system and method for compressing digital pen stroke data. More specifically, the invention is directed toward a system and method for compressing digital pen stroke data utilizing curve simplification.

2. Background Art

In the past few years, digital pen devices have become very popular. People are increasingly using digital pens in a variety of applications including word processors, presentation software, calendaring and database programs, electronic mail including instant messenger, and so on. There are also a variety of devices that use pens as their main input devices such as cellular phones, Personal Data Assistants (PDAs), Pocket Personal Computers (PC), and Tablet PCs. For instance, Tablet PCs allow users to input data with a digital pen as well as a standard keyboard or mouse. Tablet PCs have special screens which use an active digitizer to enable users to write directly on the screen to control their PC and to input information as handwriting or a drawing. This process—called inking—enables users to add "digital ink" to a full range of applications, which appears as natural-looking handwriting on the screen. The digitized handwriting can be converted to standard text through handwriting recognition, or it can remain as handwritten text. Both the converted text in typeface and the cursive handwritten text function equally well as data formats in various applications and on various platforms. That is, both forms of text can be sent as e-mail from an email program and exchanged as documents in a word processor, and can be sent from the Tablet PC to a desktop computer or a Pocket PC, which can display the text in the same character format that it was sent in.

Compared to the keyboard device, one disadvantage with digital pen devices is the number of bits that are needed to represent the ink stokes. It only takes one byte of data to represent each ASCII letter when using a keyboard. However, when a letter is written with a digital pen or similar device, all the points in the stroke must be stored. At an average writing speed, the stroke of a letter contains on average about 50 points. Each point consists of two coordinates. In the most naïve way, it can be thought that 16 bits per coordinate are required. Therefore, a letter written by a digital pen device would typically need 2*16*50 or 1600 bits to store. A perhaps even more serious problem with the stroke representation of a digital pen is the bandwidth overhead in communication, especially since digital ink is so readily transferable between a variety of devices and applications. When people use pens to send an email or instant message, the amount of bandwidth required for the ink strokes is much larger than that required to transfer the ASCII letters generated by a keyboard for a similar amount of text created.

To address these problems, people have developed ink compression software. The emerging systems in this area of endeavor entropy encode the differences between the neighboring points of the stroke. Entropy encoding is a coding scheme that assigns codes to symbols so as to match code lengths with the probabilities of the symbols. Typically, entropy encoders are used to compress data by replacing symbols represented by equal-length codes with symbols represented by codes proportional to the negative logarithm of the probability. Therefore, the most common symbols use the shortest codes. Two of the most common entropy encoding techniques are Huffman coding and arithmetic coding. Since entropy encoding is lossless, however, the amount of compression that can be achieved for these emerging systems is limited.

SUMMARY

The invention is directed toward a system and method for compressing handwriting or digital inks. The concept behind the invention is that it is possible to remove a significant number of the points in the smooth sections of a stroke with little effects on the visual appearance. In communication applications such as electronic mail, the main concern with using digital pen devices to create strokes is the readability of the created strokes by humans. The ink and handwriting compression system and method according to the invention does not degrade readability of the stroke data when compressing it. In one embodiment of the invention, the invention provides a lossy compression procedure to further reduce the amount of data required to store and transmit ink data. This procedure utilizes a two-par procedure to reduce and compress the number of data points representing the ink data. The ink and handwriting compression system and method also utilizes curve splines to reconstruct and smooth the lossy ink data image. However, the invention is not limited to lossy encoding/decoding schemes. Other conventional encoding schemes can also be used in encoding and decoding the simplified stroke curve.

The ink and handwriting compression system and method generally describes digital pen stroke data as a curve. This curve is then simplified by reducing the number of points necessary to describe the stroke data. The simplified curve can then be either save or transmitted to another device. Prior to saving or transmitting the simplified stroke curve, it can be encoded to provide a further compressed representation of the simplified stroke curve.

The process of simplifying the curve involves, for a set of points defining a stroke, computing a chordal deviation between the simplified stroke curve and the original stroke curve for each corresponding point of the stroke curve and then finding the point p with the minimum chordal deviation. If the chordal deviation of p is less than a prescribed maximum chordal deviation, the point with the minimum chordal deviation is removed and the chordal deviations for the two points that are the neighbors of the removed point are computed. This process of removing points is repeated until the chordal deviation of all points remaining in the simplified curve is greater than a prescribed maximum chordal deviation, or a prescribed number of allowable points that define the simplified stroke curve has been reached. This process can also be modified to allow the removal of more than one point p at a time as long as these points p have chordal deviations within some prescribed range from the minimum chordal deviation and are no further than a prescribed minimum distance from each other.

Once the simplified curve has been created, either before or after encoding, it can be smoothed. In one embodiment of the ink and handwriting system and method, in order to smooth the simplified curve the cusp points are determined. The simplified curve is then smoothed by smoothing the points that are not cusp points. This smoothing can be performed by employing piecewise Hermite splines. It is not absolutely necessary to smooth the simplified curve, however, as the simplified curve itself is very readable even without smoothing.

As mentioned previously, the simplified curve can be encoded before transmitting or saving it. The encoding process is generally a two-part process wherein the data is first quantized and then encoded. This encoding process involves inputting a group of N strokes wherein each stroke contains npt+1 points (different strokes have a different npt value) and each point is represented by an (x, y) coordinate pair. The N strokes are then quantized. The process of quantizing the stroke data consists of determining the differences (deltas) in the x and y coordinates for the simplified stroke curve points. The x and y coordinates and their deltas of the simplified stroke points are then rounded to a nearest multiple of a prescribed step size which results in a set of modified x and y coordinates and corresponding delta values. The sequence of all npt values for each stroke, the first points $\{x_0, y_0\}$ of each stroke, and the sequence of concatenated delta a and delta y values are all entropy encoded, and appended to the stroke number to create an encoded bit stream. This encoded bit stream can then either be saved or transmitted to a receiving device.

When desired the encoded bit stream can then be decoded to reconstitute the stroke curve and render it on a display. The decoded bit stream can be used to generate a final image of the strokes in vector or bitmap form by connecting the encoded points via straight lines or by employing splines.

The ink and handwriting compression system and method of the invention has many advantages. Due to the efficiency of the compression digital ink can more easily be passed from the application to application and device to device as digital ink, without requiring large bandwidths. Additionally, the data compression achievable by the invention allows the stroke data to be stored using far less computer memory than if conventional means were used to compress the data.

In addition to the just described benefits, other advantages of the present invention will become apparent from the detailed description which follows hereinafter when taken in conjunction with the drawing figures which accompany it.

DESCRIPTION OF THE DRAWINGS

The specific features, aspects, and advantages of the invention will become better understood with regard to the following description, appended claims, and accompanying drawings where:

DETAILED DESCRIPTION OF THE PREFERRED EMBODIMENTS

In the following description of the preferred embodiments of the present invention, reference is made to the accompanying drawings that form a part hereof, and in which is shown by way of illustration specific embodiments in which the invention may be practiced. It is understood that other embodiments may be utilized and structural changes may be made without departing from the scope of the present invention.

1.0 EXEMPLARY OPERATING ENVIRONMENT

Figure 1:
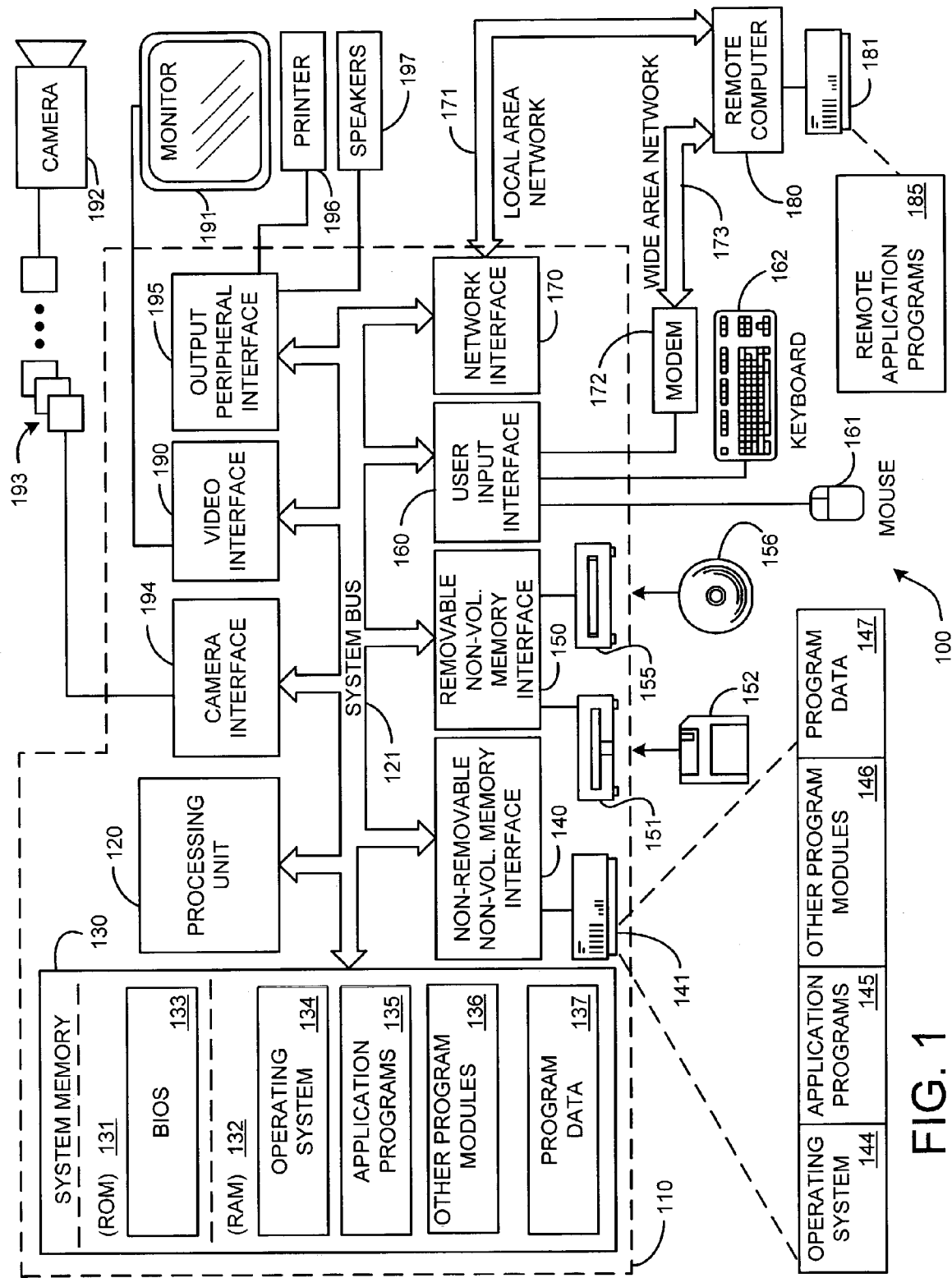
FIG. 1 is a diagram depicting a general purpose computing device constituting an exemplary system for implementing the invention.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks were performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tap, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through anon-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195. Of particular significance to the present invention, a camera 163 (such as a digital/electronic still or video camera, or film/photographic scanner) capable of capturing a sequence of images 164 can also be included as an input device to the personal computer 110. Further, while just one camera is depicted, multiple cameras could be included as an input device to the personal computer 110. The images 164 from the one or more cameras are input into the computer 110 via an appropriate camera interface 165. This interface 165 is connected to the system bus 121, thereby allowing the images to be routed to and stored in the RAM 132, or one of the other data storage devices associated with the computer 110. However, it is noted that image data can be input into the computer 110 from any of the aforementioned computer-readable media as well, without requiring the use of the camera 163.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

The exemplary operating environment having now been discussed, the remaining parts of this description section will be devoted to a description of the program modules embodying the invention.

2.0 A SYSTEM AND METHOD FOR INK OR HANDWRITING COMPRESSION

2.1 General Overview

The invention, referred to herein as the ink and handwriting compression system and method, is useful for compressing digital ink and handwriting stroke data. The concept behind the invention is that it is possible to remove a significant number of the points in the smooth sections of a stroke with little effect on the visual appearance. The stroke smoothing and compression do not affect the readability of the compressed stroke data. In one embodiment, the invention provides a lossy compression procedure to further reduce the amount of data required to store and transmit the ink data.

Figure 2A:
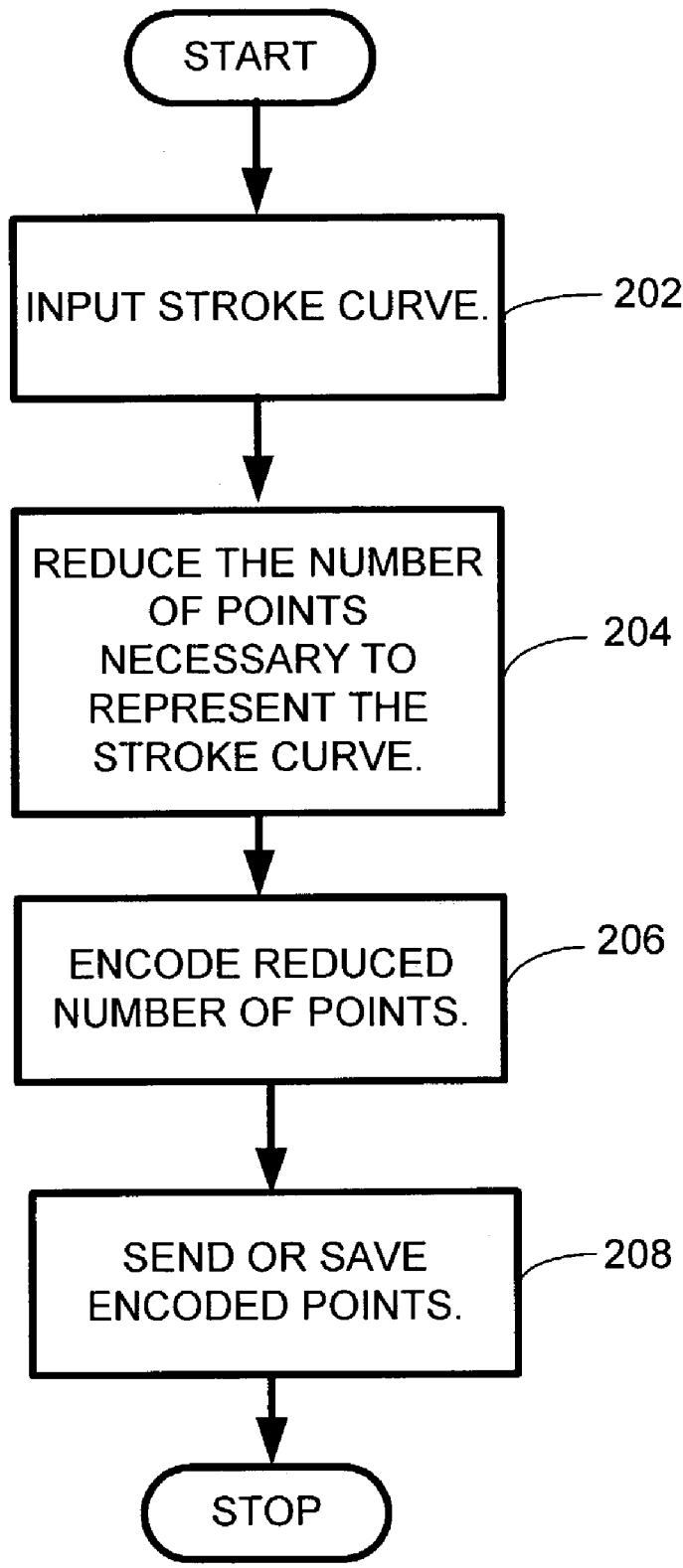
FIG. 2A is a simplified flow diagram of the compression process employed by the ink and handwriting compression system and method according to the invention.
Figure 2B:
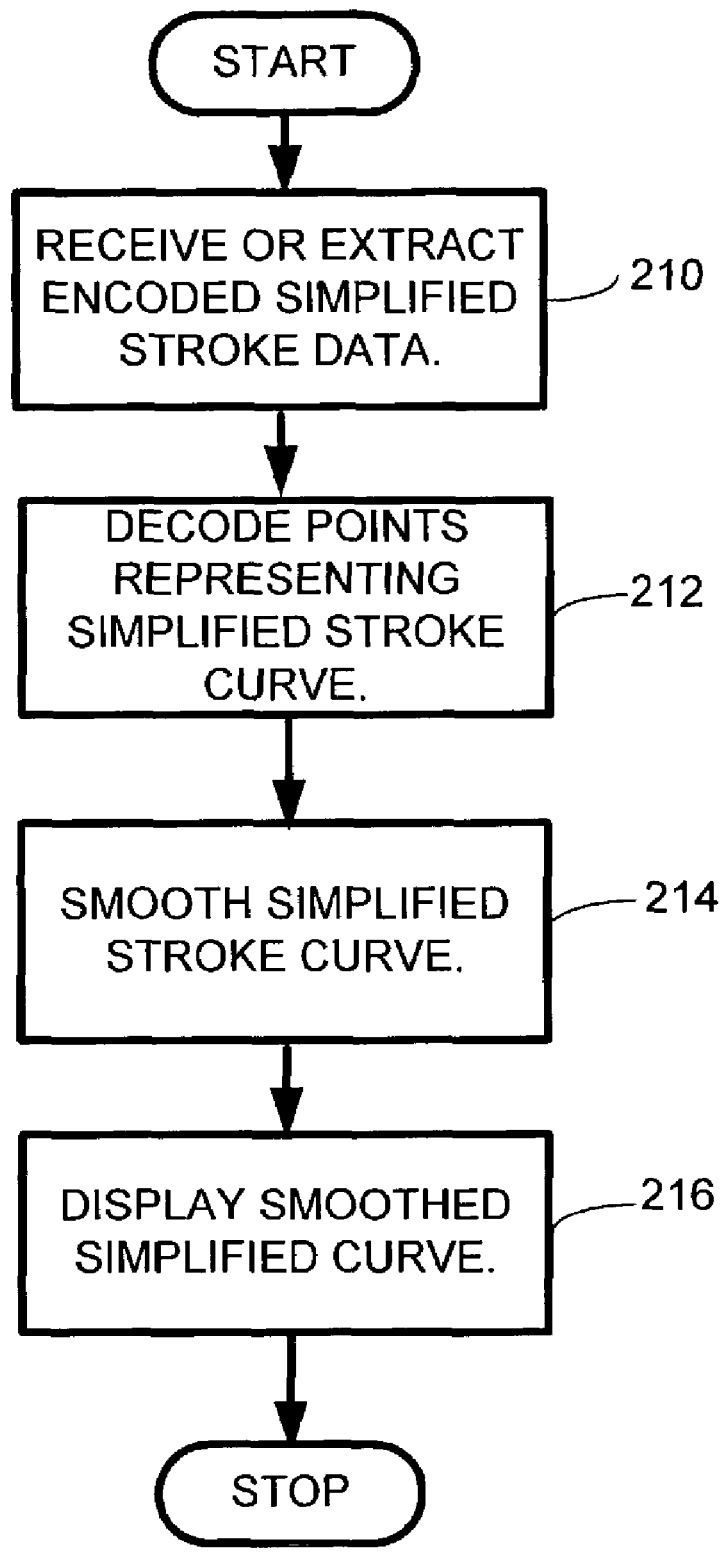
FIG. 2B is a simplified flow diagram of the stroke curve reconstruction process employed by the ink and handwriting compression system and method according to the invention.

An overall flow diagram of the handwriting or ink compression system and method is shown in FIGS. 2A and 2B. As shown in FIG. 2A, initially digital ink stroke data is input in the form of a curve represented by a series of points (process action 202). The number of points necessary to represent the stroke data curve are then reduced as shown in process action 204. The simplified stroke curve made up of the reduced number of points is then encoded (process action 206) and transferred to another device or stored (process action 208).

Referring now to FIG. 2B, when it is desired to access the encoded data, the encoded simplified stroke curve is extracted and decoded as shown in process actions 210 and 212. The simplified decoded stroke curve can optionally be smoothed to provide for more readable, less blocky results (process action 214). The simplified curve, either smoothed or not, can then be displayed via conventional rendering techniques (process action 216).

2.2 Stroke Simplification

As discussed previously, digital links are usually grouped into strokes. A stroke starts when the pen first touches the surface, and it ends when the pen leaves the surface. Each ink stroke consists of a number points. The position of each point is represented by a two dimensional vector: (u,v). Thus, a stroke can be though of as a two dimensional (2D) curve. In general, the first step of handwriting and ink compression system and method is to simplify the curve. There are two conflicting goals. One is to remove as many points as possible. The other goal is to preserve the appearance of the curve.

There has been much work on curve simplification. Most of the curve simplification algorithms are complex and require complicated data structures because they try to achieve the optimum solution while achieving a good asymptotic complexity. These algorithms are best suited for the curves with tens of thousands of points. In the typical case of a handwriting or ink sample, the number of points for each stroke is in general quite small (e.g., it typically ranges from 30 to 300). Hence, the aforementioned complicated algorithms may not be efficient due to the constant cost of setting up the data structures. To overcome these problems, the ink and handwriting compression system and method according to the invention chooses a procedure which is fast and easy to implement, although in theory it is not guaranteed to be optimal. Exemplary working embodiments of the ink and handwriting compression system have shown, however, that the employed method is very fast and achieves good point reductions without significantly affecting the appearance of the strokes.

The following is an outline of the stroke curve simplification process actions where epsilon is given a user, or is otherwise prescribed, and which specifies the maximum distance between the original curve and the simplified curve.

1. Compute the chordal deviation for each point of the stroke. The chordal deviation is the distance between the original stroke curve and the simplified curve.
2. Find the point p with the minimum chordal deviation.
3. If the chordal deviation of p is larger than a prescribed maximum chordal deviation epsilon, stop. Otherwise go to 4.
4. Remove the point with the minimum chordal deviation.
5. Re-compute the chordal deviations for the two points that are the neighbors of the removed point 6. Go to 2.

Figure 3:
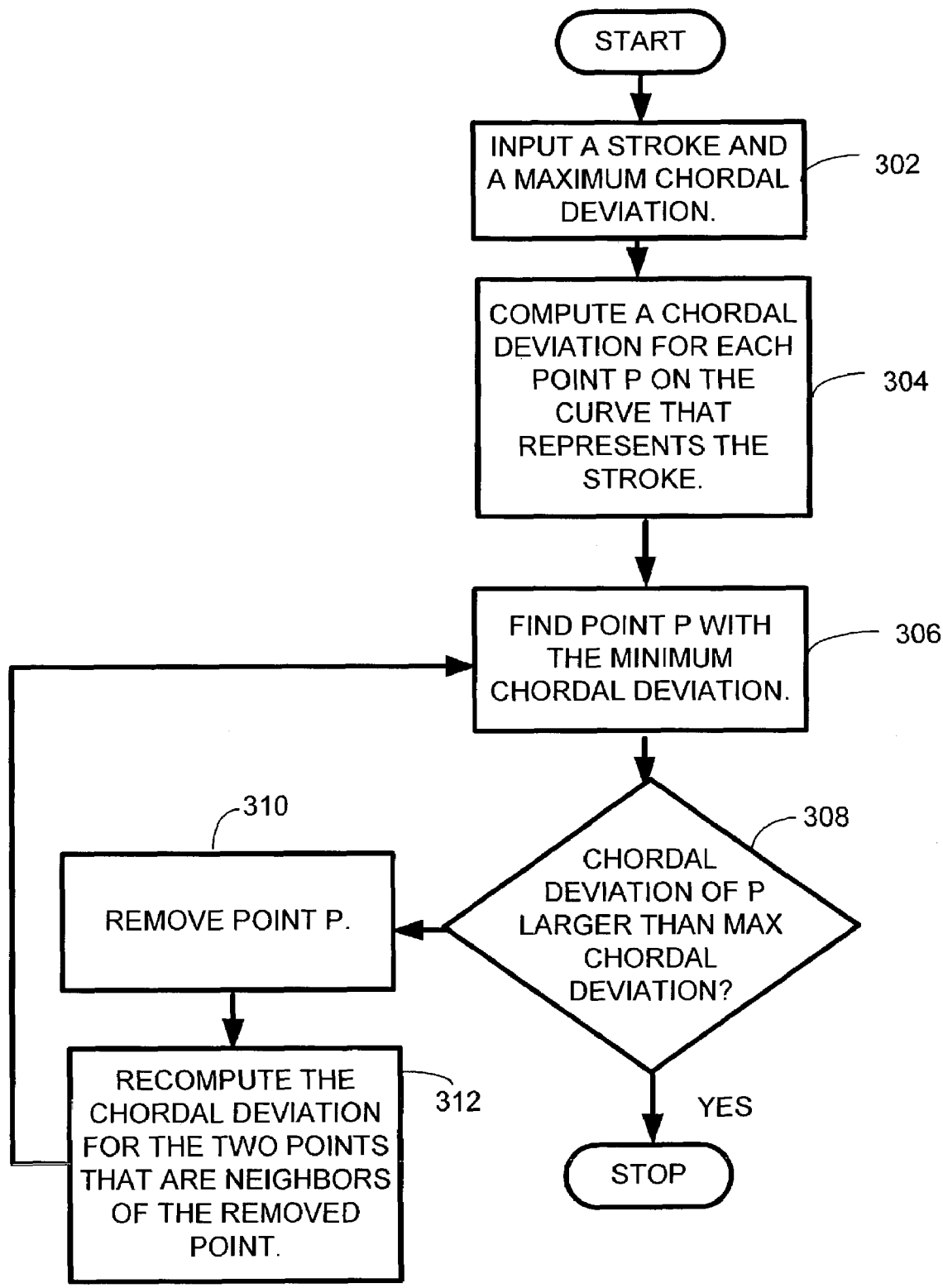
FIG. 3 is flow diagram depicting the process of curve simplification employed in the ink and handwriting compression system and method according to the invention.

This procedure of stroke curve simplification is shown in FIG. 3. A stroke and a maximum chordal deviation is input into the handwriting and compression system and method (process action 302). The chordal deviation for each point on the stroke curve is computed, as shown in process action 304. Note that for subsequent iterations if the chordal deviation was previously computed for any of the points and has not changed, then the chordal deviations for these points are still valid and do not need to be recomputed. The point p with the minimum chordal deviation is then found (process action 306). If the chordal deviation of p is greater than the prescribed maximum chordal deviation (process action 308), the procedure is stopped. If the chordal deviation of p is less than the prescribed maximum chordal deviation, the point is removed from the curve (process actions 308 and 310).The chordal deviations for the two points that were the neighbors of the removed point are then recomputed (process action 312) and the process is repeated starting at process action 306. This curve simplification process can be repeated until all points that are less then the maximum chordal deviation have been removed or the total number of original points defining the curve have been reduced to facilitate transmission or for other purposes. It should also be noted that in one working embodiment of the invention multiple points where p is minimum or close to the minimum may be removed from the curve if any of the two points do not have a neighbor in common.

In one embodiment of the invention, a double linked list is used to store the points. When a point is removed, a pointer is just changed to link to the point after the removed point in the curve sequence. Therefore, it takes constant period of time to remove a point. To reduce the cost of finding the point with the minimum chordal deviation, a heap is used to maintain the list of chordal deviations. A heap represents a particular organization of a random access data structure. The data points in the heap satisfy two key properties: (1) the value pointed to by the first element of the heap is the smallest value in the heap; (2) the value pointed to by the first element may be removed by a pop operation, or a new element added by a push operation, in logarithmic time. Both the pop and push operations return valid heaps. This sorting technique, known as heap sort, is a "in-place" sort, requires no auxiliary storage, and has a guaranteed O(N log N) complexity even in the worst case.

At each iteration, after the chordal deviations have been updated and the point has been removed, it is necessary to adjust the heap so as to preserve the heap property. There are well-known algorithms to adjust the heap with the worst case complexity of log(n) where n is the total number of points. Therefore, the asymptotic complexity of the simplification algorithm is O(nlog(n)). Perhaps more importantly, this procedure has little overhead at each iteration. It is very efficient in practice.

2.3 Encoding the Simplified Curve

The next stage of the handwriting and ink compression system and method is to encode the simplified points, although the curve simplification alone provides significant compression. Different conventional coding methods can be used to encode and decode the stroke data after curve simplification. Since the overall compression scheme of the handwriting and ink compression system and method is lossy, however, one embodiment of the invention uses a lossy coding approach. This coding technique employs delta coding. The essence of delta coding involves storing changes to data instead of the absolute value of the data. The delta coding method used in this embodiment of the invention is discussed in the following paragraphs.

Figures 4, 5:
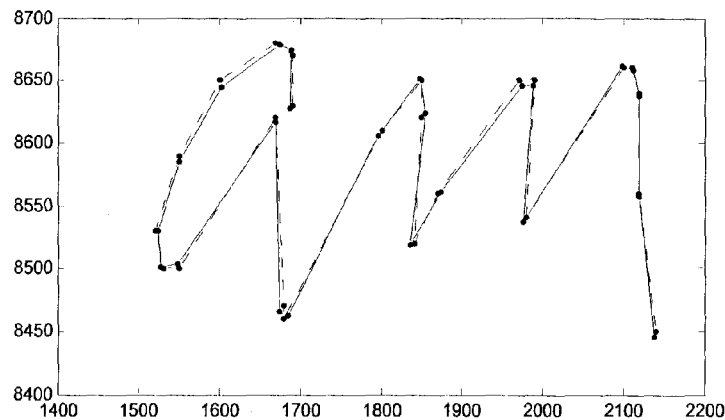
FIG. 4 shows a typical stroke (the characters "am" in cursive writing) after simplification.
FIG. 5 provides a table shows the x,y coordinates of the simplified stroke and their deltas from the original stroke.

FIG. 4 shows a typical stroke (the characters "am" in cursive writing) after simplification. The original points of the simplified stroke curve are shown as a solid line. The modified (e.g., quantized) points of the stroke curve are shown as a dashed line. FIG. 5 is a table that shows the x,y coordinates of the points of the simplified stroke shown in FIG. 4 and their differences or deltas from the point that came before in the stroke curve. In the "modified points" table, the numbers were rounded to nearest multiple of a step size (in this case, a step size of 10, but other values could be used). As can be seen, the deltas in the modified points table are now all forced to be a multiple of the step size and can all be divided by the step size before sending them to the entropy encoding. This reduces the number of bits that will be produced. The dotted line of FIG. 4 shows that visually the modified/quantized points produce a stroke that is quite similar to the original simplified stroke. By adjusting the step size one can control the tradeoff between visual fidelity and amount of compression.

Figure 6:
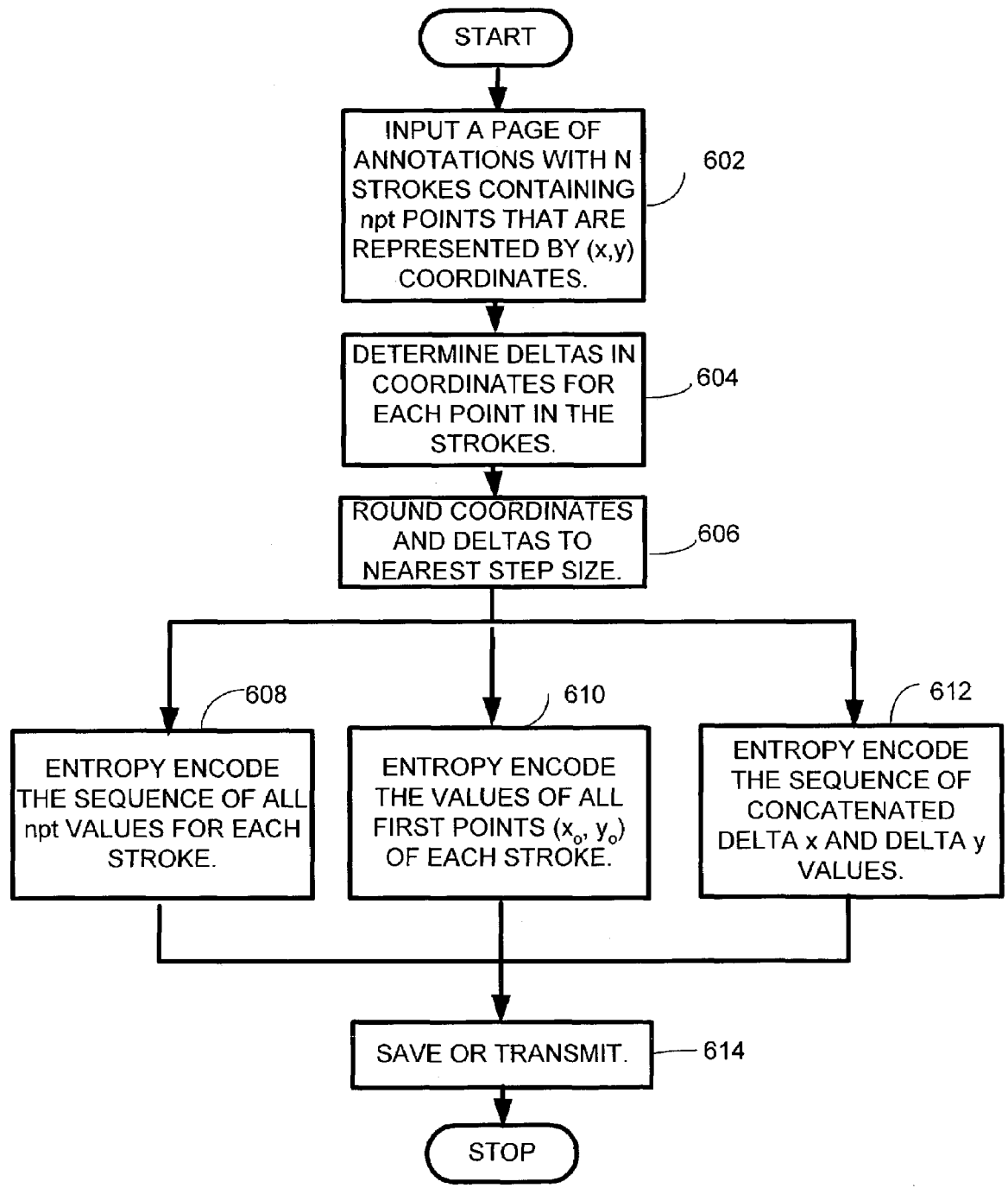
FIG. 6 is a flow diagram depicting the process of quantizing and encoding the stroke data in one embodiment of the invention.
Figure 7:
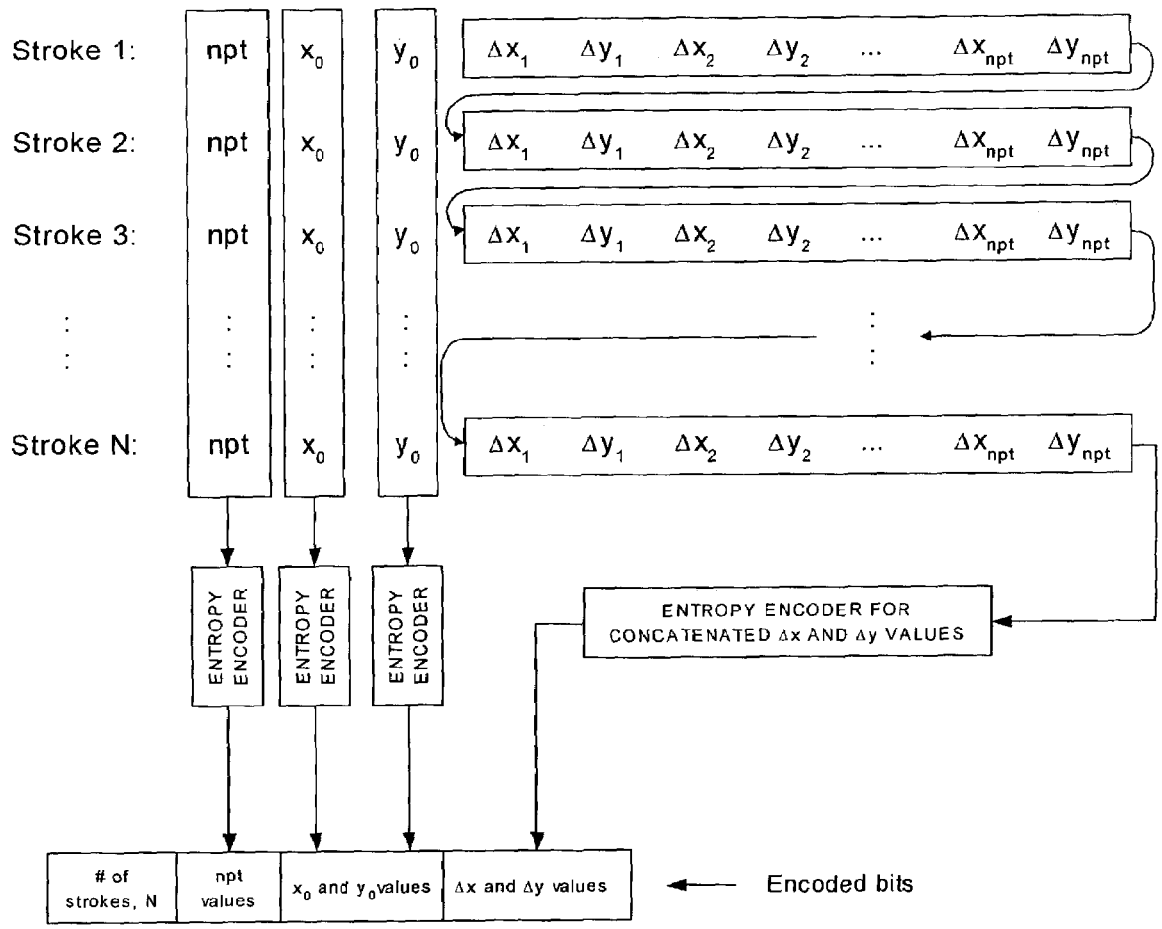
FIG. 7 is a diagram that shows how all of the strokes on one page or any other collection of strokes (e.g. a generic annotation block) can be grouped. Encoding a group of strokes at once leads to better compression than encoding each one independently.

Encoding a group of strokes at once leads to better compression than encoding each one independently. FIG. 6 generally shows the process actions of quantizing the stroke data and encoding it. Referring to FIG. 6, a page of annotations that contains N strokes is input into the system (process action 602). Each stroke contains npt+1 points, and each point is represented by an {x,y} coordinate pair. This data is first quantized. To do this, as discussed above, the differences or deltas in the x and y coordinates are determined for each point of the stroke (process action 604). The simplified stroke point coordinates and their deltas are rounded to a nearest multiple of a prescribed step size (process action 606). After the modification (quantization) described in process actions 602 and 604, the data is encoded. Specifically, the sequence of all npt values for each stroke, the first points $\{x_0, y_0\}$, and the sequence of concatenated delta x and delta y values are entropy encoded (process actions 608, 610, 612). The encoded bit stream then contains four basic sections, as shown in FIG. 7:

1. # of strokes=N;
2. entropy-coded sequence of all npt values for each stroke;
3. entropy-encoded values of all first-point $\{x_0, y_0\}$ of each stroke [they can also be encoded by representing the first $\{x_0, y_0\}$ value and then the differences]; and
4. entropy-encoded sequence of concatenated delta x and delta y values.

This data can be saved to computer memory or sent to a receiving device, as shown in process action 614.

Figure 8:
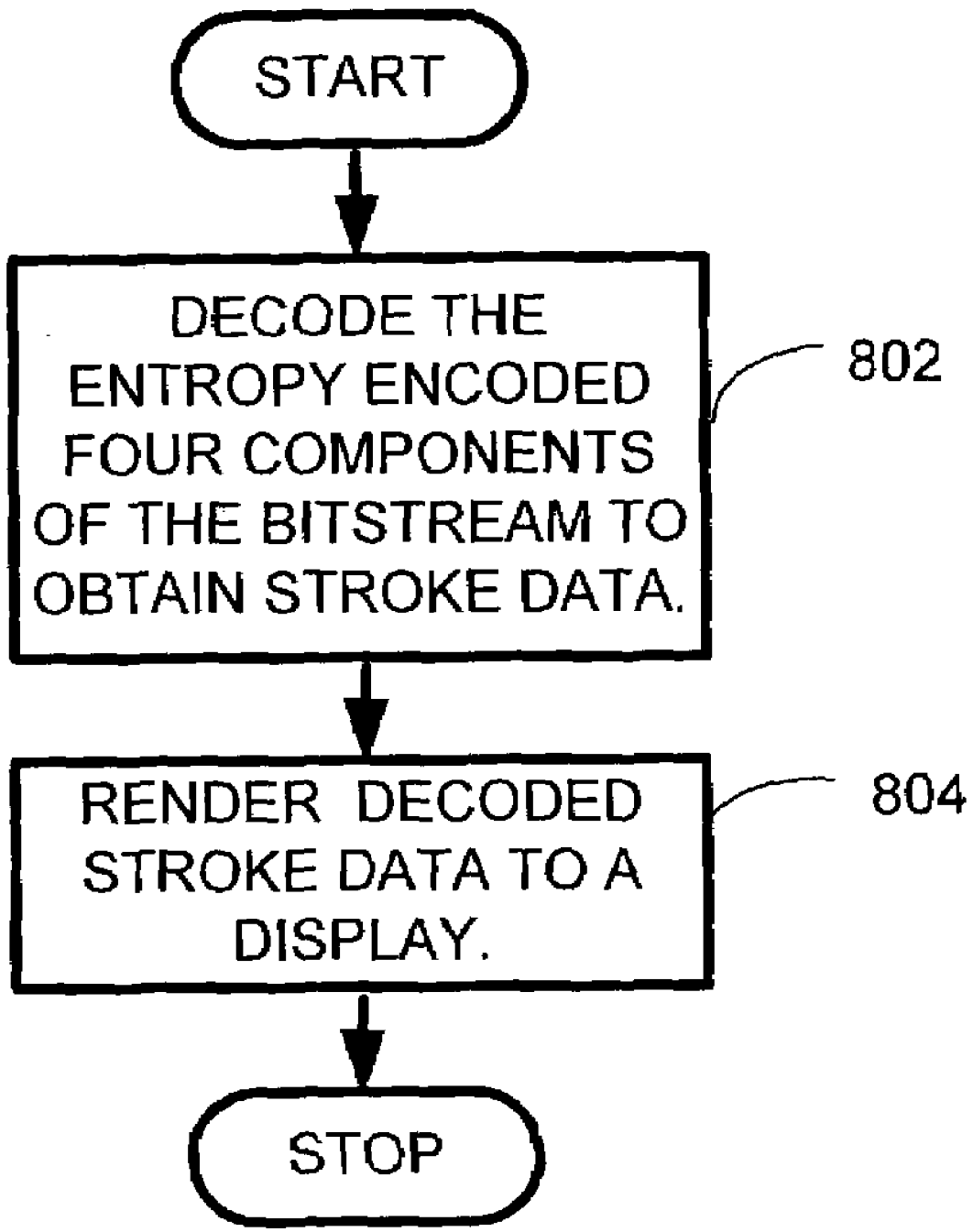
FIG. 8 is a flow diagram depicting the process of how the data is decoded in one embodiment of the invention.

Once the data is saved or transmitted to another device, it can be extracted and decoded. As shown in FIG. 8, the decoder reads the four components of the bit stream (process action 802), and from those it can decode all the stroke data shown in FIG. 8. For each stroke, the coordinate of each point is reconstructed by adding the first point of the stroke $\{x0,y0\}$ with all the subsequent deltas up to this point. From the decoded points, as shown in process action 804, a conventional render module generates the final image of the strokes (in vector or bitmap form) by "connecting the dots" in each stroke via either straight lines (as shown in FIG. 4), or via spline curves.

2.4 Smoothing the Simplified Curve

After simplification, either with or without encoding/decoding, the strokes may appear not as smooth as before. Their polygonal edges may start to be visible. In one embodiment of the invention splines are used to interpolate the simplified points to construct a smooth stroke. More specifically, in one embodiment of the ink and handwriting system and method according to the invention, Hermite splines are used. A Hermite spline is a cubic curve for which the endpoints and the parametric derivatives of the curve at the two endpoints are provided.

In general, a stroke contains a number of points where the curve makes sharp turns. For example, when the letter "b" is written, there is a sharp turn at the end of the vertical segment. Such points on these sharp curves are called cusps. More specifically, a cusp is the angle between successive points that define the stroke curve. At the cusps, it is not desirable to make the curve appear smooth. Otherwise, this may introduce large reconstruction errors. A reconstruction/smoothing procedure was designed to take this issue into consideration.

Figure 9:
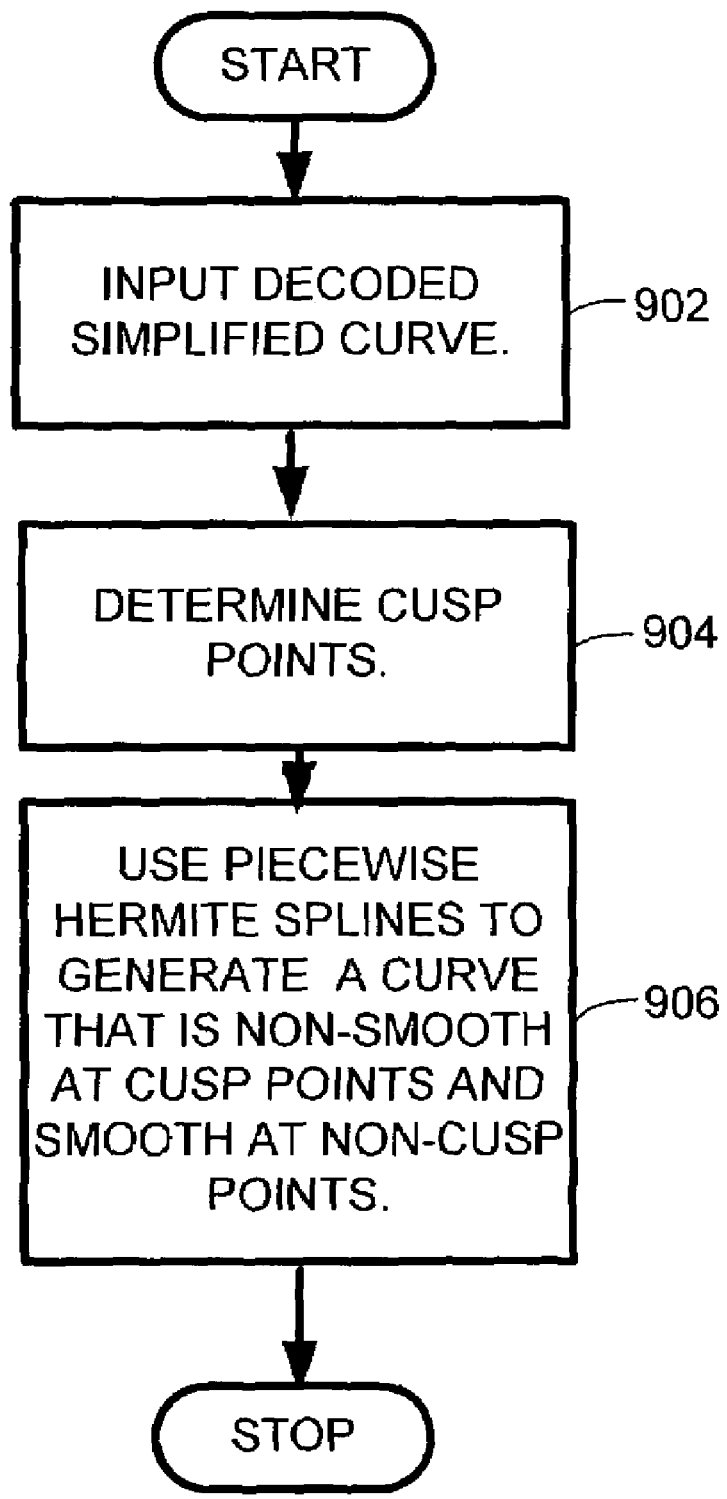
FIG. 9 is a flow diagram generally depicting the process of smoothing a simplified curve.

FIG. 9 is an overview of how the reconstruction/smoothing procedure is implemented. A simplified decoded curve is input into the ink and handwriting compression system, as shown in process action 902. The cusp points are determined by comparing the angle between successive points to a prescribed threshold (process action 904). For the cusp points, the curve data is not smoothed (process action 906). For non-cusp points, the simplified curve data is smoothed. In one embodiment of the invention this smoothing is performed using piecewise Hermite splines. Basically, the concept behind using Hermite splines is that given two points, if the tangent to both is known a smooth parametric curve of cubic polynomials is uniquely defined. To define a hermite curve between each two adjacent points on the stroke, one needs to determine the derivatives of x and y coordinates with respect to the parameter t at the two points. For each coordinate, its derivative at each point on the stroke is computed as the weighted average of the derivatives of the two line segments which are adjacent to this point. Assuming the x (or y) derivatives of the two adjacent line segments are p1 and p2, and assuming the length of the two line segments are l1 and l2, then the x (or y) derivative at this point is set to be w*p1+(1−w)*p2 where w=l1/(l1+l2). The following paragraphs describe the algorithm behind the smoothing using piecewise Hermite splines.

Suppose $(x_1,y_1), \ldots, (x_n,y_n)$ are the points on the stroke after simplification. The stroke can be thought of as a piecewise linear curve. For any point on the curve, let t be the arc length from the beginning of the curve to this point, then the coordinates of this point is a function of t. In this way, the curve is parameterized as x=x(t), y=y(t). Notice that x(t) and y(t) are piecewise linear functions. In order to use Hermite splines, it is necessary to determine the derivatives at each point on the stroke curve. Therefore, let $t_i$ be the parameter corresponding to the point $(x_i, y_i)$. For each point $t_i$, if it is a cusp, one sets $x'(t_i)$–0. Otherwise, one sets $x'(t_i(=w_i*(x(t_i+1)-x(t_i))/(t_i+1-t_i)+(1-w_i)$ $(x(t_i)-x(t_i-1))/(t_i-t_i-1)$ where $w_i-1_i/(1_i+1_{i+1})$ and $1_i$ is the distance between point i and i+1.

The $y'(t_i)$ is defined similarly. Notice that one may define the weight $w_i$ differently. For example, one could simply set $w_i$ to be 0.5.

Denote $t_0=t_i$, $t_1=t_i+1$. Denote $A=x(t_0)$, $B=x(t_i)$, $P=x'(t_0)$, $Q=x'(t_1)$. For any t in $[t_0, t_i]$, the Hermite interpolation formula for x(t) is $x(t)=a+b(t-t_0)+c(t-t_0)^2+d(t-t_0)^3$ where $a=A$, $b=P$, $c=(3B-3A-Q(t_1-t_0)-2P(t_1-t_0)/(t_1-t_0)^2$ $d=(2A-2B+Q(t_1-t_0)+P(t_1-t_0))/(t_1-t_0)^3$.

The reconstructed spline has the property that the curve is non-smooth at the original cusp points, and it is smooth at the other points.

Wherefore, what is claimed is:

1. A computer-implemented process for compressing digital pen stroke data, comprising the process actions of:
    describing a digital pen stroke as a curve defined by a set of points;
    reducing the number of points necessary to describe said curve by computing a chordal deviation between the points of the original pen stroke curve and corresponding points of a simplified curve to determine which points to eliminate in order to produce a simplified curve representing the pen stroke, wherein reducing the number of points to produce a simplified curve further comprises:
    for a set of points defining a stroke,
    (a) computing a chordal deviation between the simplified stroke curve and the original stroke curve for each corresponding point of the stroke;
    (b) finding the point p with the minimum chordal deviation;
    (c) if the chordal deviation of p is less than a prescribed maximum chordal deviation,
    (d) removing the point with the minimum chordal deviation;
    (e) re-computing the chordal deviations for the two points that are the neighbors of the removed point;
    repeating the process actions (b) through (e) until the chordal deviation of all points is greater than a prescribed maximum chordal deviation, or a prescribed number of allowable points that define said simplified curve has been reached.

2. The computer-implemented process of Claim 1 further comprising the process actions of one at least one of:
    saving the simplified curve; and
    transmitting the simplified curve to a receiving device.

3. The computer-implemented process of Claim 2 further comprising the process action of further compressing the simplified curve by encoding the simplified stroke curve.

4. The computer-implemented process of Claim 3 wherein the process action of encoding the simplified curve comprises the process actions of:
    inputting a group N strokes wherein each stroke contains npt+1 points and each point is represented by an (x, y) coordinate pair;
    quantizing each of said N strokes;
    entropy encoding the sequence of all npt values for each stroke, the first points $\{x_0, y_0\}$ of each stroke, and the sequence of concatenated delta x and delta y values to create an encoded bit stream.

5. The computer-implemented process of Claim 4 wherein the process action of quantizing the stroke data comprises the process actions of:
    determining the differences in the x and y coordinates from the point that came before in the stroke curve for each point of the stroke, wherein the difference in the x coordinates is delta x and the difference in the y coordinates is delta y;
    rounding said x and y coordinates and the respective differences to a nearest multiple of a prescribed step size.

6. The computer-implemented process of Claim 4 wherein the encoded bit stream contains the number of strokes N; the entropy-coded sequence of all npt values for each stroke, the entropy-encoded values of all first-points $\{x_0, y_0\}$ of each stroke; and the entropy-encoded sequence of concatenated delta x and delta y values.

7. The computer-implemented process of Claim 4 further comprising the process action of decoding the encoded bit stream of the strokes.

8. The computer-implemented process of Claim 7 wherein the process action of decoding comprises the process actions of:
    entropy decoding the sequence of all npt values for each stroke, the first points $\{x_0, y_0\}$ of each stroke, and the sequence of concatenated delta x and delta y values from the encoded bit stream,
    adding the delta x and delta y values to the set of first points $\{x_0, y_0\}$ of each stroke to reconstruct all coordinates for the strokes.

9. The computer-implemented process of Claim 8 wherein the process action of rendering said decoded bit stream comprises generating a final image of the strokes in vector form by connecting the encoded points via straight lines.

10. The computer-implemented process of Claim 7 further comprising the process action of rendering said decoded bit stroke on a display.

11. The computer-implemented process of Claim 10 wherein the process action of rendering said decoded bit stream comprises generating a final image of the strokes in bitmap form by connecting the encoded points using straight lines.

12. The computer-implemented process of Claim 10 wherein the process action of rendering said decoded bit stream comprises generating a final image of the strokes in vector form by connecting the encoded points via spline curves.

13. The computer-implemented process of Claim 10 wherein the process action of rendering said decoded bit stream comprises generating a final image of the strokes in bitmap form by connecting the encoded points using spline curves.

14. The computer-implemented process of Claim 1 wherein said prescribed maximum chordal deviation is input by a user.

15. The computer-implemented process of claim 1 further comprising the process action of smoothing said simplified curve.

16. The computer-implemented process of Claim 15 further comprising the process actions of:
inputting the simplified curve;
determining the cusp points of the simplified curve;
smoothing the simplified curve by smoothing the points that are not cusp points.

17. The computer-implemented process of Claim 15 wherein the process of smoothing the simplified curve by smoothing the points that are not cusp points comprises the process action of using piecewise Hermite splines to smooth said simplified curve.

18. A computer-readable memory containing a computer program that is executable by a computer to perform the method recited in Claim 1.

19. A computer-implemented process for compressing digital pen stroke data, comprising the process actions of:
describing a digital pen stroke as a curve defined by a set of points;
reducing the number of points necessary to describe said curve by computing a chordal deviation between the points of the original pen stroke curve and corresponding points of a simplified curve to determine which points to eliminate in order to produce a simplified curve representing the pen stroke, wherein the process action of reducing the number of points to produce a simplified curve comprises the process actions of:
for a set of points defining a stroke,
 (a) computing a chordal deviation between the simplified stroke curve and the original stroke curve for each corresponding point of the stroke;
 (b) finding one or more points p with the chordal deviations within a prescribed range from the minimum chordal deviation;
 (c) if the chordal deviations of p are less than a prescribed maximum chordal deviation, and the one or more points p do not have a neighboring point in common,
 (d) removing the one or more points within the prescribed range from the minimum chordal deviation;
 (e) re-computing the chordal deviations for the two points that are the neighbors of the removed points;
repeating the process actions (b) through (e) until the chordal deviation of all points is greater than a prescribed maximum chordal deviation, or a prescribed maximum number of allowable points that define said simplified curve has been reached.

20. A system for compressing handwriting strokes, the system comprising
a general purpose computing device; and
a computer program comprising program modules executable by the computing device, wherein the computing device is directed by the program modules of the computer program to,
define handwriting strokes as a curve, and
simplify said handwriting strokes by deleting a number of points that define the curve in the substantially straight regions of the curve by using a chordal deviation computation to determine which points to delete in order to create a simplified stroke curve, wherein the module for simplifying the handwriting strokes further comprises sub-modules for:
for a set of points defining a stroke,
 (a) computing a chordal deviation between the simplified stroke curve and the original stroke curve for each corresponding point of the stroke curve;
 (b) finding the point p with the minimum chordal deviation;
 (c) if the chordal deviation of p is less than a prescribed maximum chordal deviation,
 (d) removing the point with the minimum chordal deviation;
 (e) re-computing the chordal deviations for the two points that are the neighbors of the removed point;
repeating sub-modules (b) through (e) until the chordal deviation of all points not removed from the simplified stroke curve is greater than a prescribed maximum chordal deviation, or a prescribed maximum number of allowable points that define said curve has been reached.

21. The system of Claim 20 further comprising a module for encoding the simplified curve to provide a further compressed representation of the simplified stroke curve.

22. The system of Claim 21 wherein the module for encoding the simplified curve comprises sub-modules for:
inputting a group N strokes wherein each stroke contains npt+1 points and each point is represented by an (x, y) coordinate pair;
determining the differences in the x and y coordinates from the point that came before in the stroke curve for each point of the stroke, wherein the difference in the x coordinates is delta x and the difference in the y coordinates is delta y;
rounding said x and y coordinates and the respective differences to a nearest multiple of a prescribed step size;
entropy encoding the sequence of all npt values for each stroke, the first points $\{x_0,y_0\}$ of each stroke, and the sequence of concatenated delta x and delta y values and apending these to stroke count to create an encoded bit stream.

23. The system of Claim 21 further comprising a module for decoding the encoded bit stream of the strokes.

24. The system of Claim 23 wherein the module for decoding the encoded bit stream of the strokes comprises sub-modules for:
entropy decoding the sequence of all npt values for each stroke, the first points $\{x_0,y_0\}$ of each stroke, and the sequence of concatenated delta x and delta y values from an encoded bit stream,
adding the delta x and delta y values to the set of first points $\{x_0,y_0\}$ of each stroke to reconstruct all coordinates for the strokes.

25. The system of Claim 23 further comprising a module for rendering said decoded bit stroke on a display.

26. The system of Claim 25 wherein the module for rendering said decoded bit stream comprises generating a final image of the strokes in vector form by connecting the encoded points via spline curves.

27. The system of Claim 25 wherein the module for rendering said decoded bit stream comprises generating a final image of the strokes in bitmap form by connecting the encoded points using straight lines.

28. The system of Claim 25 wherein the module for rendering said decoded bit stream comprises generating a final image of the strokes in bitmap form by connecting the encoding points using spline curves.

29. The system of Claim 23 wherein the module for rendering said decoded bit stream comprises generating a final image of the strokes in vector form by connecting the encoded points via straight lines.

30. A system for compressing handwriting strokes, the system comprising
    a general purpose computing device; and
    a computer program comprising program modules executable by the computing device, wherein the computing device is directed by the program modules of the computer program to,
    define handwriting strokes as a curve; and
        simplify said handwriting strokes by deleting a number of points that define the curve in the substantially straight regions of the curve by using a chordal deviation computation to determine which points to delete in order to create a simplified stroke curve, wherein the module for simplifying the handwriting strokes further comprises sub-modules for:
        for a set of points defining a stroke,
            (a) computing a chordal deviation between the simplified stroke curve and the original stroke curve for each corresponding point of the stroke;
            (b) finding the point p with the minimum chordal deviation,
            (c) if the chordal deviation of p is less than a prescribed maximum choral deviation,
            (d) removing the point with the minimum chordal deviation;
            (e) re-computing the chordal deviations for the two points that are the neighbors of the removed point;
            repeating sub-modules (b) through (e) until the chordal deviation of all points not removed from the simplified stroke curve is greater than a prescribed maximum chordal deviation.

31. A system for compressing handwriting strokes, the system comprising
    a general purpose computing device; and
    a computer program comprising program modules executable by the computing device, wherein the computing device is directed by the program modules of the computer program to
    define handwriting strokes as a curve; and
        simplify said handwriting strokes by deleting a number of points that define the curve in the substantially straight regions of the curve by using a chordal deviation computation to determine which points to delete in order to create a simplified stroke curve, wherein the module for simplifying the handwriting strokes further comprises sub-modules for:
        for a set of points defining a stroke,
            (a) computing a chordal deviation between the simplified stroke curve and the original stroke curve for each corresponding point of the stroke;
            (b) finding one or more points p with the chordal deviations with a prescribed range from the minimum chordal deviation;
            (c) if the chordal deviations of p are less than a prescribed maximum choral deviation, and the one or more points p have no neighboring points in common,
            (d) removing the one or more points within the prescribed range from the minimum chordal deviation;
            (e) re-computing the chordal deviations for the two points that are the neighbors of the removed points;
            repeating sub-modules (b) through (e) until the chordal deviation of all points not removed from the simplified stroke curve is greater than a prescribed maximum chordal deviation, or a prescribed maximum number of allowable points that define said curve has been reached.

32. A computer-readable medium having computer-executable instructions for transmitting script strokes, said computer executable instructions comprising:
    describing a script stroke as a curve defined by a set of points;
    simplifying the curve by eliminating at least one point of the set of points to produce a simplified curve representing the script stroke wherein at least one point of the set of points eliminated is determined by using a chordal deviation computation, wherein the instruction for simplifying the curve comprises sub-instructions for:
    for a set of points defining a stroke,
        (a) computing a chordal deviation between the simplified stroke curve and the original stroke curve for each corresponding point of the stroke;
        (b) finding the point p with the minimum chordal deviation;
        (c) if the chordal deviation of p is less than a prescribed maximum choral deviation,
        (d) removing the point with the minimum chordal deviation;
        (e) re-computing the chordal deviations for the two points that are the neighbors of the removed point;
        repeating the process actions (b) through (e) until the chordal deviation of all points is greater than a prescribed maximum choral deviation, or a prescribed number of allowable points that define said simplified curve has been reached; and
    sending the simplified curve to a device that either stores or processes said simplified curve.

33. The computer-readable medium of Claim 32 further comprising an instruction for further compressing the simplified curve by encoding prior to sending said curve to said device.

34. A computer-readable medium having computer-executable instructions for receiving a compressed pen stroke, said computer executable instructions comprising:
    receiving a compressed pen stroke defined as a curve at a receiving device;
    determining the cusp points of the compressed pen stroke curve;
    smoothing the pen stroke curve by smoothing the points of the curve that are not cusp points wherein smoothing the curve by smoothing the points that are not cusp points comprises a sub-instruction for employing piecewise Hermite splines to smooth said curve, and wherein said sub-instruction for employing piecewise Hermite splines to smooth said curve comprises sub-instructions for:
    inputting two points defined by x and y coordinates on a stroke curve defined by a number of points;
    determining the derivatives of each of the two points as the weighted average of the derivatives of the two line segments which are adjacent to each point, where the weights are determined by the lengths of the two line segments each of which is defined as the Euclidean distance between its two end points, which are adjacent points on the curve.

35. A computer-implemented process for encoding a handwriting stroke represented by a curve comprises the process actions of:
    inputting a group N strokes wherein each stroke contains npt+1 points and each point is represented by an (x, y) coordinate pair;
    quantizing each of said N strokes;

entropy encoding the sequence of all npt values for each stroke, the first points $\{x_0,y_0\}$ of each stroke, and the sequence of concatenated delta x and delta y values to create an encoded bit stream.

36. The computer-implemented process of Claim 35 wherein the process action of quantizing the stroke data comprises the process actions of:
   determining the difference in the x and y coordinates from the point that came before in the stroke curve for each point of the stroke, wherein the difference in the x coordinates is delta x and the difference in the y coordinates is delta y;
   rounding said x and y coordinates and the respective differences to a nearest multiple of a prescribed step size.

37. The computer-implemented process of claim 35 wherein the encoded bit stream contains the number of strokes N; the entropy-coded sequence of all npt values for each stroke; the entropy-encoded values of all first-points $\{x_0,y_0\}$ of each stroke; and the entropy-encoded sequence of concatenated delta x and delta y values.

38. A computer-implemented process for decoding an encoded bit stream of strokes, comprising the process actions of:
   for a encoded bit stream that comprises:
   a number of strokes N wherein each stroke contains npt+1 points and each point is represented by an (x, y) coordinate pair,
   an entropy-coded sequence of all npt values for each stroke; and entropy-encoded values of all first-points $\{x_0,y_0\}$ of each stroke;
   and an entropy-encoded sequence of concatenated delta x and delta y values, wherein the difference in the x coordinates is delta x and the difference in the y coordinates is delta y,
   entropy decoding the sequence of all npt values for each stroke, the first points $\{x_0,y_0\}$ of each stroke, and the sequence of concatenated delta x and delta y values from an encoded bit stream,
   adding the delta x and delta y values to the set of first points $\{x_0,y_0\}$ of each stroke to reconstruct all coordinates for the strokes.

39. The computer-implemented process of Claim 38 further comprising the process action of rendering said decoded bit stroke on a display.

40. The computer-implemented process of Claim 38 wherein the process action of rendering said decoded bit stream comprises generating a final image of the strokes in vector from by connecting the encoded points via straight lines.

41. The computer-implemented process of Claim 38 wherein the process action of rendering said decoded bit stream comprises generating a final image of the strokes in vector form by connecting the encoded points via spline curves.

42. The computer-implemented process of Claim 38 wherein the process action of rendering said decoded bit stream comprises generating a final image of the strokes in bitmap form by connecting the encoded points using straight lines.

43. The computer-implemented process of claim 38 wherein the process action of rendering said decoded bit stream comprises generating a final image of the strokes in bitmap form by connecting the encoded points using spline curves.

44. A computer-implemented process for smoothing a handwriting stroke represented by a curve by employing piecewise Hermite splines, comprising the process actions of:
   inputting two points defined by x and y coordinates on a stroke curve defined by a number of points;
   determining the derivatives of each of the two points as the weighted average of the derivatives of the two ling segments which are adjacent to each point, where the weights are determined by the lengths of the two line segments each of which is defined as the Euclidean distance between its two end points, which are adjacent points on the curve.

* * * * *